July 12, 1927.
R. H. WHITE
1,635,596
RUBBER TREAD ATTACHMENT FOR TRACK LINKS
Filed Nov. 14, 1925
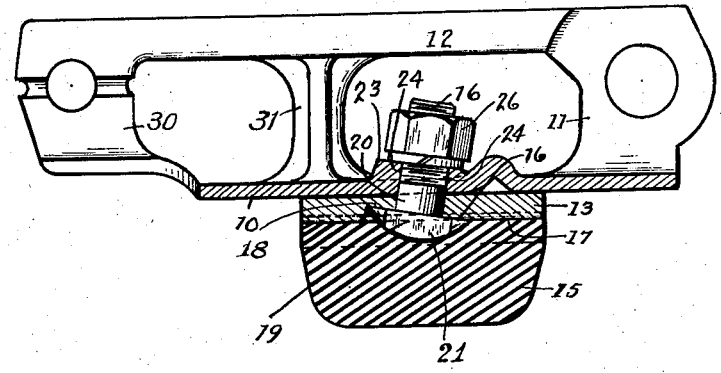
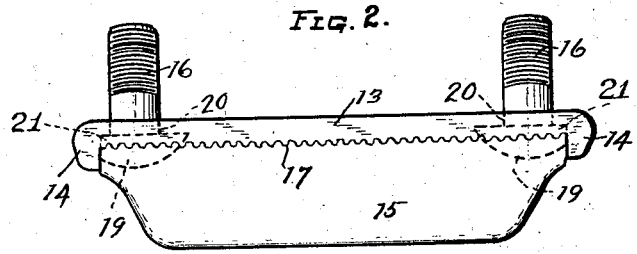
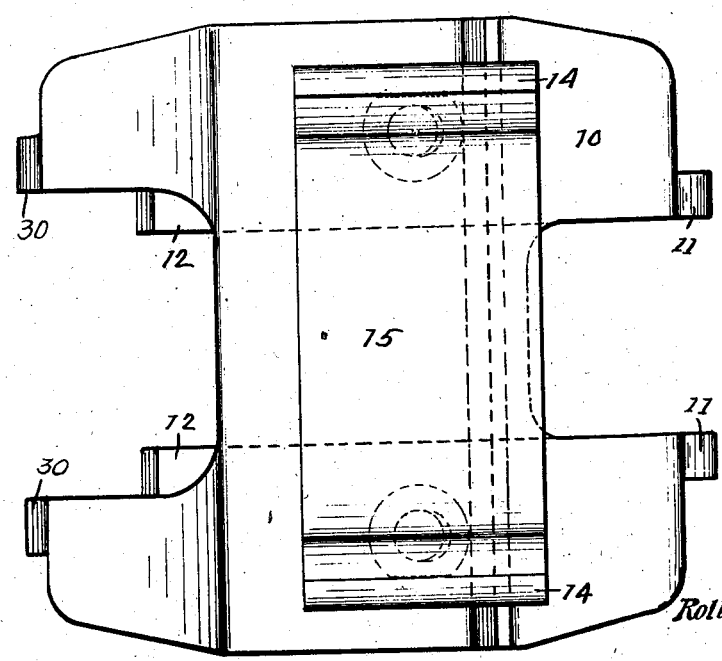
Inventor.
Rollin H. White,
W M Hart
ATTORNEY Patented July 12, 1927.

1,635,596

UNITED STATES PATENT OFFICE.

ROLLIN H. WHITE, OF CLEVELAND HEIGHTS, OHIO.

RUBBER TREAD ATTACHMENT FOR TRACK LINKS.

Application filed November 14, 1925. Serial No. 69,181.

This invention relates to track belts for track laying tractors and more particularly to tread attachments for the links comprising the track belts.

When a track laying tractor is to be operated over certain types of surfaces such as roads, flooring and the like which would afford little traction for grouters and which would be injured thereby, it is customary to equip the links comprising the track belts with tread plates carrying a rubber or similar traction element. Such tread plates are usually detachable so that the same track can be employed with either a grouter or pad equipment to meet varying conditions. With the tread plates having rubber pads associated therewith considerable difficulty has been encountered in associating the elements so that they will not become loosened by the turning and forward and rearward operation of the tractor, and also in securing the unit with the links so that relative movement is prohibited.

An object of my invention is to provide a detachable tread plate unit for track links, in which a plate and a rubber traction element are secured together so that they will not be moved relatively by the operation of the tractor.

A further object of my invention is to provide means for securing detachable tread plate units to track links so that there will be no relative longitudinal or lateral movement during the operation of the tractor mounted thereupon.

The invention consists in the construction and combination of parts shown in the drawings, and hereinafter described and definitely pointed out in the appended claims.

In the drawings, Figure 1 is a side sectional elevation of a detachable tread plate unit secured with one link of a track belt; Fig. 2 is end elevation of the tread unit; and Fig. 3 is a bottom plan view of the assembly.

The link shown is constructed so that by pivoting a desired number of them together an endless track belt, for a track laying tractor, will be formed. They correspond to the conventional type of links now in use in that each is formed as an integral casting having a shoe portion 10, upstanding end posts 30, intermediate posts 31 and upstanding side portions 11 which terminate in parallel rails 12 upon which the tractor rollers bear. The shoe projects beyond the sides and ends of the side portions and their rails, and the distance between the inner surfaces of the rails at one end of the link is substantially equal to the distance between the outer surface of the rails at the other end of the link, so that the end of the rails of adjacent links will be complementary to be pivoted together.

The tread plate unit is arranged to be secured against the bottom surface of the shoe of a link of the general character set forth above, and the purpose of this invention is to provide securing means between the link and the tread plate, and the tread plate elements so as to prevent relative movement thereof.

The tread plate unit consists of a rectangularly shaped metal plate 13 having downturned sides 14, a solid rubber pad 15 and securing bolts 16. The surface 17 of the plate, intermediate the sides 14 is corrugated and the rubber pad is seated thereagainst and is vulcanized in such relation so as to be tightly secured therewith. The pad is of such width that the sides bear against the downturned sides of the plate.

The plate 13 is provided with a pair of inclined seats 18 which are formed in the corrugated face and against which the flat base of the head portions 19 of the bolts 16 are seated. Apertures 20 extend centrally from the seats 18 through the plate 13, and at right angles to the seats, the shanks of the bolts extending therethrough. The seats are preferably located adjacent the downturned sides of the plate, and a side portion of each bolt head is provided with a flat portion 21 which is assembled to bear against the plate side adjacent thereto. Such arrangement provides a means to prevent rotation of the bolts when assembled with the plate.

In assembling the tread plate unit, the bolts are first inserted through the apertures 20 until the bases of the heads 19 bears against the seats 18 and then the rubber pad is placed within the upturned sides of the plate, covering the bolt heads, and is vulcanized to the corrugated surface and sides of the plate. It will be seen that the bolts are rigidly anchored by such assembly and vulcanizing, and that the rubber pad will be retained so that it can not move either longitudinally or laterally relative to the plate.

The shoe portion of the link above described is provided with upwardly extending bosses 23 and apertures 24 extend therethrough and through the shoe at an angle. The apertures 24 are located and extend at an angle, so that the bolts 16 will extend therethrough when the tread plate unit is assembled with the link. The bolts extend upwardly through the apertures and project therefrom and split lock washers 25 and nuts 26 are provided to tightly secure the tread plate unit against the bottom surface of the shoe portion of the link.

The link illustrated is substantially the same as that described and claimed in my co-pending application Serial No. 69,182, filed Nov. 14, 1925, and the bolts are extended at an angle as described herein so that the tread units can be applied when the grouters, illustrated in the application mentioned, are removed.

It will be seen that the bolts are embedded in the rubber pad, and that the bolts are arranged so that they can not rotate. Such arrangement of the bolts and the vulcanizing of the rubber pad to the plate described will provide a structure which will withstand the driving and turning movements of a tractor without becoming loosened from each other.

Various changes can be made in the construction described without departing from the spirit of my invention and the scope of what is hereinafter claimed.

What I claim is:—

1. A detachable tread unit for track belt links comprising a plate, bolts extending through said plate and assembled therewith to prevent rotation, and a rubber tread pad vulcanized to said plate over said bolts.

2. A detachable tread unit for track belt links comprising a plate, said plate having downturned sides and an aperture adjacent each side, bolts extending through said apertures with the bases of their heads bearing against said plate, said bolt heads having flat sides bearing against said downturned sides to prevent rotation thereof, and a rubber pad vulcanized to said plate intermediate its downturned sides and over said bolt heads.

3. A detachable tread unit for track belt links, comprising a plate having downturned sides, said plate having inclined seats formed in its face intermediate said downturned sides and apertures extending therethrough concentrically with said seats, bolts extending through said apertures in said plate having their heads positioned in said seats, and a rubber pad intermediate the downturned sides of said plate, said pad being vulcanized to the heads of said bolts and to said plate.

In testimony whereof I affix my signature.

ROLLIN H. WHITE.